(12) United States Patent
Ogasawara et al.

(10) Patent No.: US 11,182,638 B2
(45) Date of Patent: Nov. 23, 2021

(54) INFORMATION PROCESSING DEVICE AND MATERIAL SPECIFYING METHOD

(71) Applicant: SONY INTERACTIVE ENTERTAINMENT INC., Tokyo (JP)

(72) Inventors: Hidehiko Ogasawara, Tokyo (JP); Hiroyuki Segawa, Kanagawa (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 69 days.

(21) Appl. No.: 16/622,925

(22) PCT Filed: Jun. 29, 2017

(86) PCT No.: PCT/JP2017/023944
§ 371 (c)(1),
(2) Date: Dec. 16, 2019

(87) PCT Pub. No.: WO2019/003383
PCT Pub. Date: Jan. 3, 2019

(65) Prior Publication Data
US 2020/0401839 A1 Dec. 24, 2020

(51) Int. Cl.
*G06T 7/73* (2017.01)
*G06K 9/46* (2006.01)
*G02B 5/30* (2006.01)

(52) U.S. Cl.
CPC ......... *G06K 9/4661* (2013.01); *G02B 5/3025* (2013.01); *G06T 7/73* (2017.01); *G06T 2207/10152* (2013.01)

(58) Field of Classification Search
CPC .. G06T 7/40; G06T 7/50; G06T 7/507; G06T 7/514; G06T 7/529; G06T 7/70; G06T 7/73; G06K 9/4661
See application file for complete search history.

(56) References Cited

U.S. PATENT DOCUMENTS

2010/0225785 A1   9/2010   Shimizu et al.
2014/0184800 A1   7/2014   Hirai et al.
(Continued)

FOREIGN PATENT DOCUMENTS

EP   0999518 A1   5/2000
JP   2010-206685 A   9/2010
(Continued)

OTHER PUBLICATIONS

International Search Report and Written Opinion dated Sep. 19, 2017, from International Application No. PCT/JP2017/023944, 11 sheets.

(Continued)

*Primary Examiner* — Andrew W Johns
(74) *Attorney, Agent, or Firm* — Katten Muchin Rosenman LLP

(57) ABSTRACT

Data of a captured image including a polarized image is acquired (S10), and space information relating to a position and a posture of a subject in a real space and the position and the posture on an imaging plane is acquired using the captured image data (S12). Next, a polarization degree distribution is acquired from a polarized image of a plurality of orientations (S14), and a position of a light source is acquired by specifying an image of a true light source by threshold value determination of the polarization degree (S16). A reflection characteristic is acquired by applying a rendering equation under assumption that luminance of the captured image is already known (S18), and a material suitable therewith is specified as a material of the subject (S20). Processing according to the material is performed to generate output data and output the data (S22).

9 Claims, 14 Drawing Sheets

(56) References Cited

U.S. PATENT DOCUMENTS

2016/0267348 A1    9/2016  Kondo
2017/0124689 A1*   5/2017  Doba et al. ............. G06T 7/593

FOREIGN PATENT DOCUMENTS

JP    2013-031054 A    2/2013
JP    2015-115041 A    6/2015
JP    2015-119277 A    6/2015

OTHER PUBLICATIONS

Kenji Hara et al., "Ichimai no Shashin kara no Hansha Tokusei no Suitei", Image Lab, May 10, 2013 (May 10, 2013), vol. 24, No. 5, pp. 62 to 65, ISSN 0915-6755.

Notice of Reasons of Refusal dated Aug. 4, 2020, from Japanese Patent Application No. 2019-526064, 3 sheets.

Estimation of the reflection property from the original Kenji, a picture laboratory, Japanese Industrial Publishing, May 10, 2013, vol. 24, No. 5, pp. 62-65, vol., No. pp. 1, 6 sheets.

1 of the original Kenji, the estimation of the light source status and the space non-uniform mirror characteristics from monocular vision, and the Journal of the Institute of Electronics, Information and Communication Engineers, Aug. 1, 2020, vol. J 93-D, No. 8, pp. 1302-1312, vol. J No. 2—, 13 sheets.

Iwagushi et al., "Classification of semitransparent substances based on distance measurement distortion of TOF camera", Report on Computer Vision and Image Media, 2016, CVIM-203, vol. 12, p. 1 to 7.

International Preliminary Report on Patentability dated Jan. 9, 2020, from International Application No. PCT/JP2017/023944, 20 sheets.

* cited by examiner

FIG.13
(a)
(b)
(c)
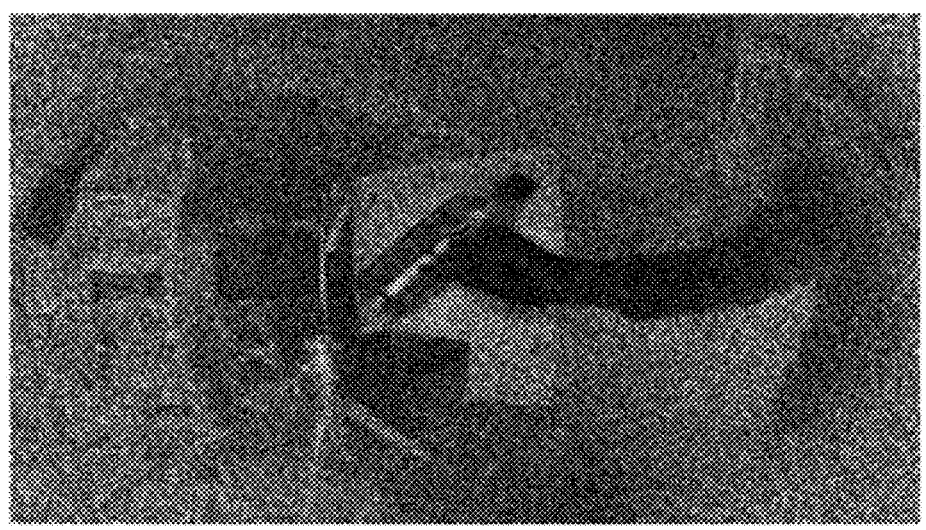

INFORMATION PROCESSING DEVICE AND MATERIAL SPECIFYING METHOD

TECHNICAL FIELD

The present invention relates to an information processing device that recognizes a state of a target substance utilizing a captured image, and to a material specifying method of the target substance.

BACKGROUND ART

A game is known in which a part of a body such as a user's head is captured by a video camera, and a display image obtained by extracting predetermined regions such as eyes, a mouth, and hands to replace them with another image is utilized (see, for example, PTL 1). There is also known a user interface system that receives a motion of the mouth or the hand captured by the video camera as an operation instruction of an application. In this way, techniques that capture the real world to display a virtual world that responds to its motion in the real world, or to utilize it for some information processing, are utilized in a wide range of fields from small-sized mobile terminals to leisure facilities.

CITATION LIST

Patent Literature

[PTL 1]
EP 0999518A

SUMMARY

Technical Problems

In image analysis in which a position and a posture of a target substance are acquired from a captured image, there is a problem that processing accuracy tends to be unstable due to an appearance or a position, imaging environment of the target substance, etc. For example, in general techniques that utilize feature points to extract or match an image of the target substance from a captured image, in a case in which the target substance originally has few feature points or the target substance is present at a position away from the camera and the apparent size is small, the processing accuracy is degraded. The more robust the processing accuracy is, the finer the processing granularity in space or time and the more complex algorithm. It results in an increased processing load.

The present invention has been made in a view of these problems, and a subject thereof is to provide a technique capable of acquiring the state of the target substance efficiently and accurately using the captured image.

Solution to Problems

One embodiment of the present invention relates to an information processing device. This information processing device includes: a space information acquisition unit configured to acquire a position and a posture of a subject in a real space on a basis of a captured image of the subject and acquire a position and a posture on an imaging plane that correspond to the position and the posture of the subject in the real space; a light source position specifying unit configured to acquire a position of a light source in the real space on a basis of the captured image; a material specifying unit configured to specify a material of the subject on a basis of a reflection characteristic of the subject when a predetermined reflection model is applied to the captured image, using the position and the posture of the subject, the position and the posture on the imaging plane, and the position of the light source; and an output data generation unit configured to output data according to the specified material.

Another aspect of the present invention relates to a material specifying method. This material specifying method includes: a step of acquiring a position and a posture of a subject in a real space on a basis of a captured image of the subject and acquiring a position and a posture on an imaging plane that correspond to the position and the posture of the subject in the real space; a step of acquiring a position of a light source in the real space on a basis of the captured image; a step of specifying a material of the subject on a basis of a reflection characteristic of the subject when a predetermined reflection model is applied to the captured image, using the position and the posture of the subject, the position and the posture on the imaging plane, and the position of the light source; and a step of outputting data according to the specified material.

It is to be noted that arbitrary combinations of the above-described components, and conversions of the expression of the present invention among methods, devices, etc., are also effective as aspects of the present invention.

Advantageous Effects of Invention

According to the present invention, it is possible to acquire a state of a target substance efficiently and accurately using a captured image.

BRIEF DESCRIPTION OF DRAWINGS

FIG. 13 depicts diagrams exemplifying a polarization degree image generated from a polarized image captured in a wide field of view in the present embodiment.

DESCRIPTION OF EMBODIMENT

Figure 1:
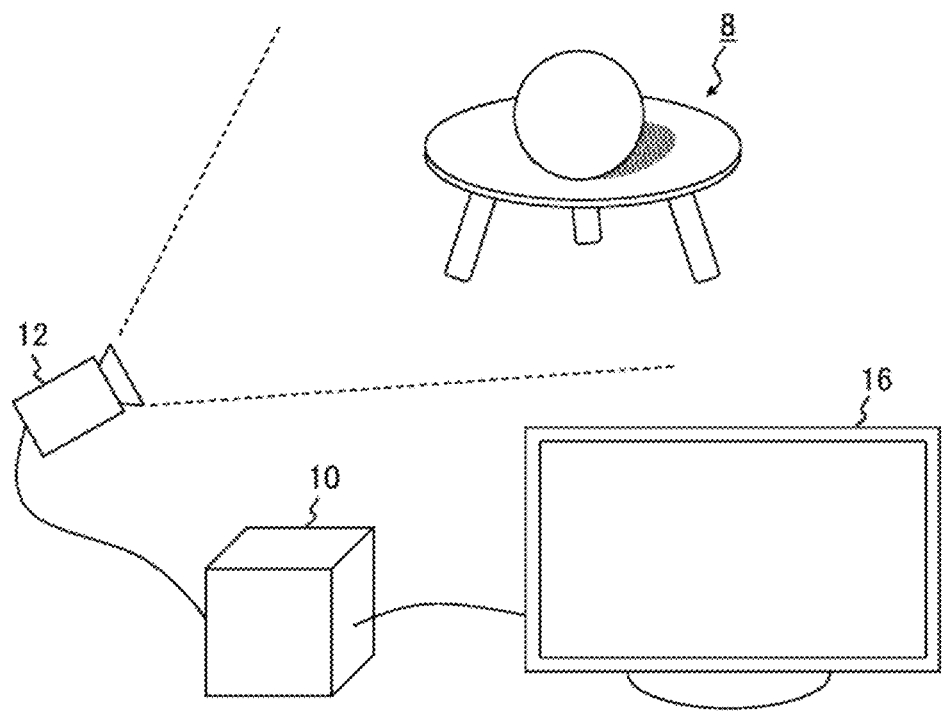
FIG. 1 is a diagram illustrating an exemplary configuration of an information processing system according to an embodiment of the present embodiment.

FIG. 1 illustrates an exemplary configuration of an information processing system according to the present embodiment. This information processing system includes an imaging device 12 for capturing a subject 8 at a predetermined frame rate, an information processing device 10 for acquiring data of the captured image to perform predetermined information processing, and a display device 16 for outputting a result of information processing. The information processing system may further include an input device for receiving an operation on the information processing device 10 from the user. The information processing device 10 may be further communicable with an external device such as a server by connecting to a network such as the Internet.

The information processing device 10, the imaging device 12, and the display device 16 may be connected by a wired cable, or may be wirelessly connected by a wireless local area network (LAN), etc. Further, any two or more of the information processing device 10, the imaging device 12, and the display device 16 may be combined to form an integral device. For example, the information processing system may be achieved by a camera or a mobile terminal equipped with the information processing device 10, and the imaging device 12, and the display device 16. Alternatively, the display device 16 may be a head mounted display for causing an image to be displayed in front of eyes by the user wearing on the user's head, and the head mounted display may be provided with the imaging device 12 so as to capture an image corresponding to a user's line-of-sight direction. In any case, external shapes of the information processing device 10, the imaging device 12, and the display device 16 are not limited to those illustrated.

In such a system, the information processing device 10 sequentially acquires data of images captured by the imaging device 12 at the predetermined frame rate, and extracts an image of the subject 8 in the image. Then, information processing is performed on the basis of an extraction result, data of a display image and voice are generated and output to the display device 16. Here, contents of the information processing performed by the information processing device 10 on the basis of the extraction result of the image is not particularly limited. For example, a predetermined target substance included in the subject 8 may be a game controller, and the game may be operated by the user holding and moving the subject 8.

In this case, an image representing a game world may vary according to a motion of the controller, or the controller may display an image replaced with a virtual object on a captured image obtained by capturing the user. Alternatively, an image representing the virtual object interacting with a user's hand can be displayed on the head mounted display in a field of view corresponding to a line-of-sight direction of the user wearing the head mounted display. Alternatively, a region of an image of a specific target substance extracted from the captured image may simply be replaced with a predetermined image, or only the region may be processed. Furthermore, an image analysis may be performed in more detail by limiting the region.

In such a technique, it is required to accurately extract an image of the subject 8 and a specific target substance included in the image from the captured image. For example, in a case in which there is another substance in a subject space, the shape of the substance being similar to the target substance whose image is to be extracted, it is necessary to distinguish and recognize those images. However, since a manner how an image appears on the image varies depending on various factors such as illuminance of the subject space, arrangements of lighting fixings, and colors and patterns of the target substance surface, the accuracy may not be stable with an extraction method based on general colors and luminance.

Therefore, in the present embodiment, attention is paid to difference in polarization characteristics depending on a material. An image in a polarized image and a subject that is an origin of the image are associated with each other on the basis of the material. This achieves an image extraction technique is achieved that is less susceptible to an appearance that varies depending on surrounding situations. Specifying of the material is useful in addition to extraction of the image of the subject. For example, even if only a part of the target substance appears in the captured image, it is possible to recognize that the target substance is present in the field of view by the material being proven. In addition, since substances in the real space may be identified depending on the material, they may be used for article inspection in a factory, movement control of a robot, etc. The information processing device 10 may perform any one of them. In order to achieve such aspects, the imaging device 12 captures at least a polarized image of the subject space.

Figure 2:
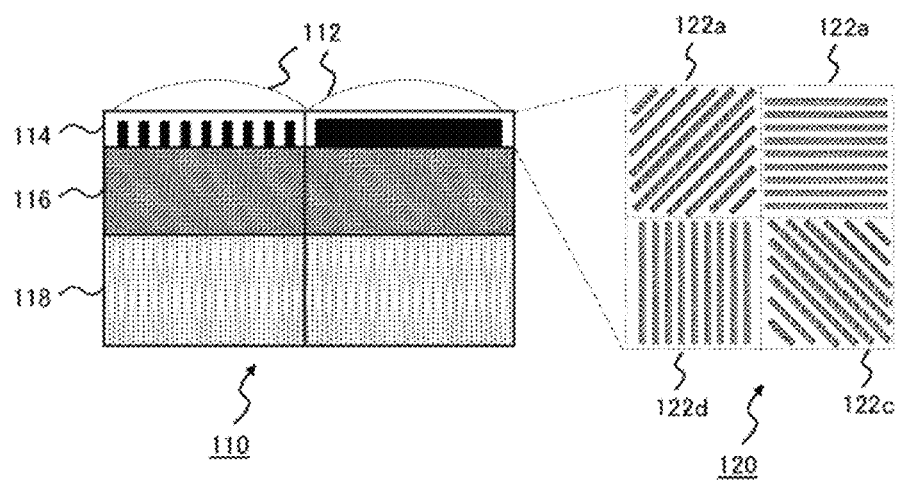
FIG. 2 is a diagram illustrating a structural example of an imaging element provided in an imaging device in the present embodiment.

FIG. 2 schematically illustrates a structural example of an imaging element provided in the imaging device 12. FIG. 2 schematically illustrates a functional structure of a cross section of an element and excludes detailed structure such as interlayer insulating films and wiring. An imaging element 110 includes a micro lens layer 112, a wire grid type polarizer layer 114, a color filter layer 116, and a light detection layer 118. The wire grid type polarizer layer 114 includes polarizers having multiple linear conductor members arranged in stripes at intervals shorter than the wavelength of incident light. When the light focused by the micro lens layer 112 is incident on the wire grid type polarizer layer 114, the wire grid type polarizer layer 114 reflects polarization components in an orientation parallel with its polarizer lines and transmits only the polarization component perpendicular to the lines.

The polarized image is acquired by detecting the transmitted polarization components in the light detection layer 118. The light detection layer 118 has an ordinary semiconductor device structure such as charge coupled device (CCD) image sensors or complementary metal oxide semiconductor (CMOS) image sensors. The wire grid type polarizer layer 114 includes arrays of polarizers with principal axis angles different in at least a charge reading unit of the light detection layer 118, i.e., at least in a pixel unit or a larger unit than the pixel unit. A polarizer array 120 when the wire grid type polarizer layer 114 is viewed from above is illustrated on the right hand in the figure.

In this figure, hatched lines denote conductors (wires) that constitute the polarizers. Each rectangle with dotted lines represents a region of polarizers with a principal axis angle. The dotted lines are not actually formed. In this example, the polarizers with four different principal axis angles are arranged in four regions 122a, 122b, 122c, and 122d, in two rows and two columns. In the figure, the polarizers positioned diagonally to each other have their principal axis angles set perpendicular to each other. The polarizers positioned adjacent to each other have an angular difference of 45 degrees therebetween. That is, the polarizers have four principal axis angles different from each other by 45 degrees.

Each polarizer transmits the polarization component in a direction perpendicular to the direction of the wire. Thus in the light detection layer 118 located below, in each of the regions corresponding to the four regions 122a, 122b, 122c, and 122d, the polarization information in four orientations different from each other by 45 degrees can be acquired. A predetermined number of such polarizer arrays with four different principal axis angles are arranged in longitudinal directions and crosswise directions and connected with a peripheral circuit that controls the timing of electric charge reading. This arrangement achieves image sensors that acquire four types of the polarization information as two-dimensional data.

The imaging element 110 illustrated in the figure has the color filter layer 116 interposed between the wire grid type polarizer layer 114 and the light detection layer 118. The color filter layer 116 includes arrays of filters that individually transmit red, green, and blue light, for example, in correspondence with each of pixels. Thus, the polarization information can be obtained for each color depending on the combination between the principal axis angles of the polarizers in the wire grid type polarizer layer 114 located above and the filter colors of the color filter layer 116. That is, since the polarization information of the same orientation and the same color is discretely obtained on the image plane, a polarized image for each orientation and for each color may be obtained by appropriately interpolating it.

In addition, non-polarization color images may also be reproduced by calculating polarized images of the same color. An image acquisition technique using the wire grid type polarizer is also disclosed, for example, in JP 2012-80065A, etc. However, an element structure of the imaging device 12 in the present embodiment is not limited to that illustrated. For example, in the present embodiment, since a polarization luminance image is basically used, the color filter layer 116 may be omitted if a color image is not necessary for other uses. Further, the polarizer is not limited to the wire grid type, and may be any of practical polarizers such as a linear dichroic polarizer. Alternatively, the polarizer may have a structure in which a polarizing plate whose principal axis angle is changeable is disposed in front of a general camera.

In the present embodiment, a polarization degree distribution is obtained from polarized images of a plurality of orientations, and is utilized to specify the material. It is known that a behavior of the polarization luminance relative to the orientation varies depending on the posture and the material of the subject surface, and the polarization degree may be regarded as an index representing the behavior. The luminance of the light observed via the polarizer varies with respect to the principal axis angle $\theta_{pol}$ of the polarizer, as expressed by the following Equation:

[Math. 1]

$$I = \frac{I_{max} + I_{min}}{2} + \frac{I_{max} - I_{min}}{2}\cos(2(\theta_{pol} - \phi)) \quad \text{(Equation 1)}$$

Where, $I_{max}$ and $I_{min}$ represent, respectively, a maximum and a minimum value of the observed luminance, and $\varphi$ denotes a polarization phase. As described above, in a case in which polarized images are obtained for four principal axis angles $\theta_{pol}$, the luminance I of the pixels at the same position satisfies Equation 1 above with respect to each principal axis angle $\theta_{pol}$. Thus, by approximating a curve passing through the coordinates (I, $\theta_{pol}$) with a cosine function using a least square method, for example, it is possible to obtain the values $I_{max}$, $I_{min}$, and $\varphi$. The values $I_{max}$ and $I_{min}$ thus obtained are used to obtain a polarization degree $\rho$ with the following Equation:

[Math. 2]

$$\rho = \frac{I_{max} - I_{min}}{I_{max} + I_{min}} \quad \text{(Equation 2)}$$

When the polarization degree $\rho$ is 1, the observed light is fully polarized (linearly polarized), i.e., is oscillating in one direction. When the polarization degree $\rho$ is zero, the light is non-polarized and oscillates isotropically. In addition, the polarization degree $\rho$ varies between 0 and 1 depending on the degree of vibration deviation. According to a dichroic reflection model, the spectrum of reflected light is expressed by the linear sum of spectrums of specular reflection and diffuse reflection. Here, the specular reflection signifies the light regularly reflected from a substance surface, and the diffuse reflection denotes the light scattered by pigment particles forming a substance. The ratio of a specular reflection component to a diffuse reflection component contained in the reflected light also depends on the material of the substance to be reflected.

Figure 3:
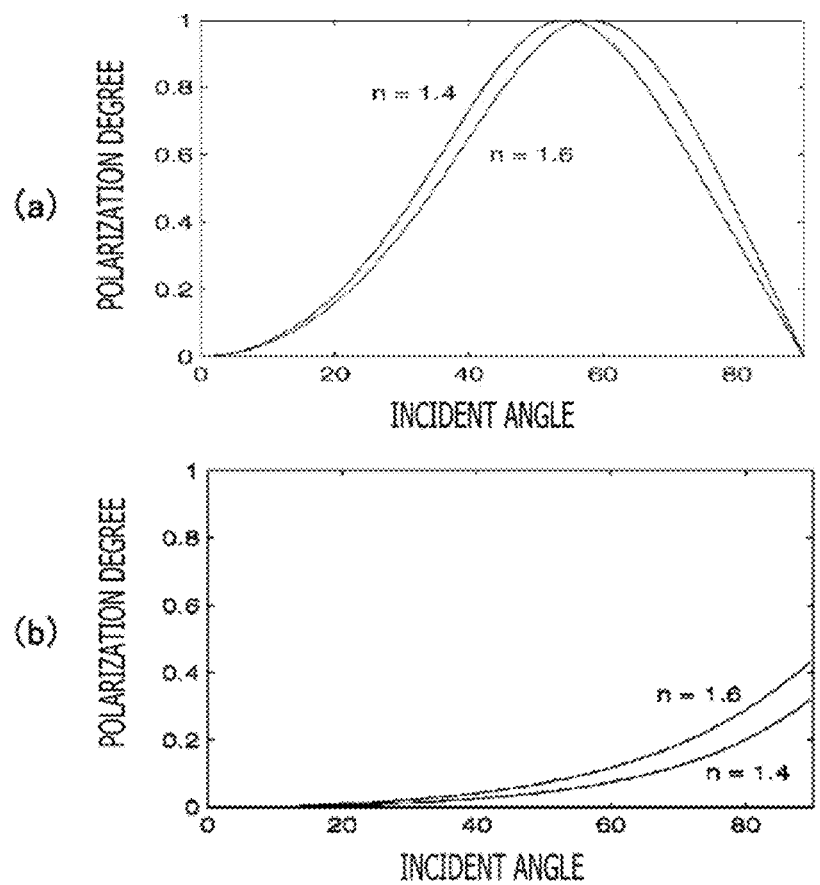
FIG. 3 depicts diagrams comparing change in polarization degree with respect to an incident angle with specularly reflected light and diffusely reflected light.

FIG. 3 compares change in polarization degree with respect to an incident angle with specularly reflected light and diffusely reflected light. The refractive index n of a substance reflecting light is 1.4 and 1.6. Compared to the specularly reflected light illustrated in (a) of FIG. 3, the diffusely reflected light illustrated in (b) of FIG. 3 has a much smaller polarization degree in the most range of incident angles. That is, an image of a subject made of such a material that the diffuse reflection is dominant has high possibility that the polarization degree appears low. By utilizing this characteristics, it is possible to extract an image of a subject having a predetermined material on the basis of the polarization degree. Also, it is generally known that direct light from a light source is isotropic, that is, the polarization degree is low. By utilizing this characteristics, it is possible to distinguish the light which originates from the light source, from the light which is specularly reflected depending on the polarization degree. The result of the distinction may be used to set the light source in specifying of a material in which a reflection model described later is utilized.

Figure 4:
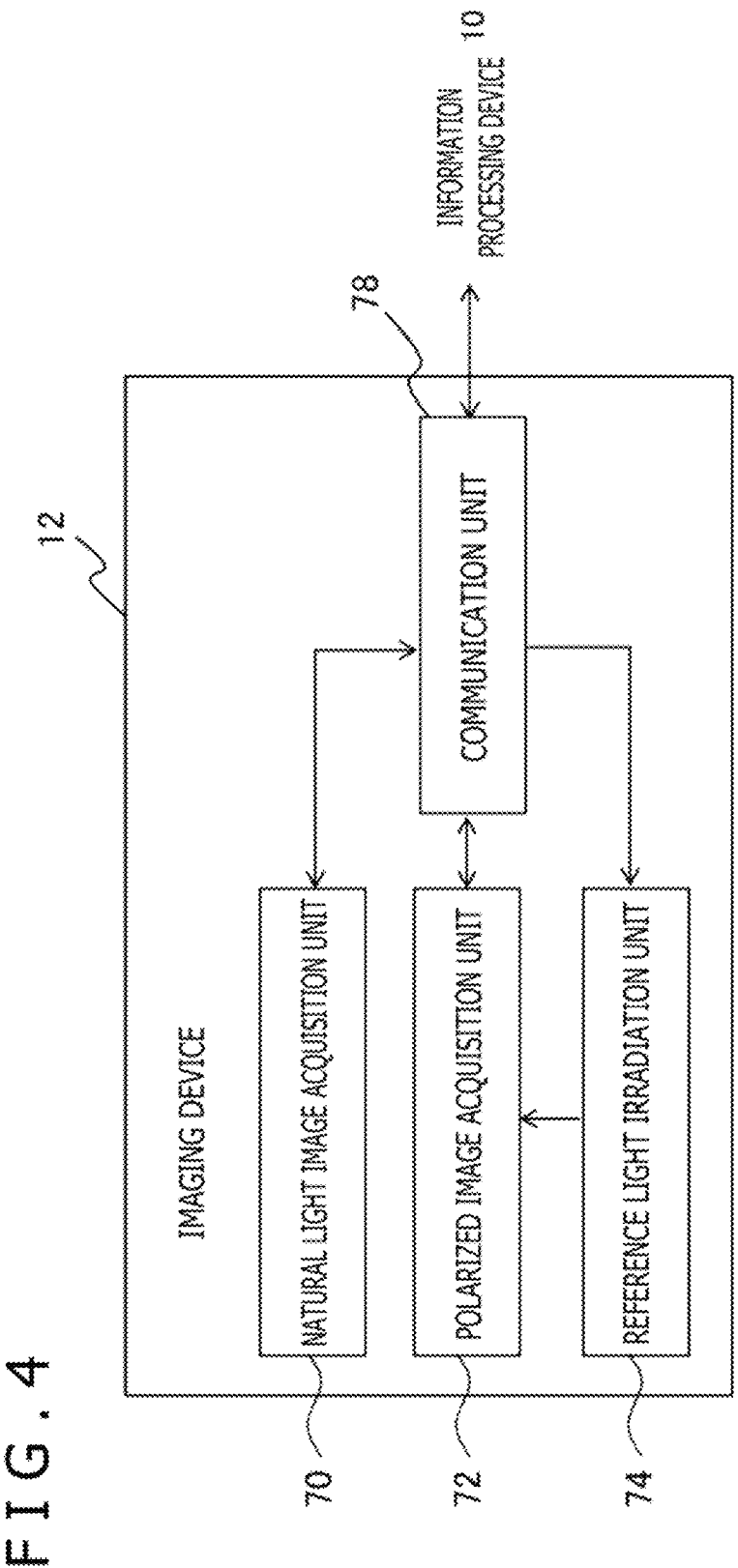
FIG. 4 is a diagram illustrating a configuration of functional blocks of the imaging device in the present embodiment.

FIG. 4 illustrates a configuration of functional blocks of the imaging device 12. In terms of hardware, each functional block illustrated in FIG. 4 and FIGS. 6 and 7 described later may be achieved by a configuration including a microcomputer, a central processing unit (CPU), a graphics processing unit (GPU), various memories, a data bus, various sensors, and the like. In terms of software, each functional block may be achieved by a program that is loaded from a recording medium etc., to the memory. The program exhibits various functions such as a data input function, a data holding function, an arithmetic function, an image processing function, and a communication function. Therefore, it is understood by the person skilled in the art that these functional blocks may be achieved in various forms by hardware only, software only, or a combination thereof, and are not limited to any of them.

The imaging device 12 includes a natural light image acquisition unit 70, a polarized image acquisition unit 72, and a reference light irradiation unit 74. The natural light image acquisition unit 70 includes an imaging element array such as a CCD or a CMOS, and thereby outputs image data of natural light (non-polarization) captured at a predetermined frame rate. The data is used in the information processing device 10 to specify the position of the light source in the subject space, or to specify a relative relation of the position and the posture between the subject space and the imaging plane.

The imaging device 12 is preferably a fisheye camera so as to be able to capture an indoor light source such as a ceiling illumination. However, in an environment where a light source is in the field of view of the camera even with ordinary lenses, a fisheye lens is not essential. Alternatively, if the position of the light source in the subject space is acquired in advance, the light source may not be appeared in the captured image. Further, in order to specify the relation of the position and the posture of the imaging plane relative to the subject space the natural light image acquisition unit 70 preferably includes a stereo camera that captures the subject space from left and right viewpoints having a predetermined distance. Depending on processing contents of the information processing device 10, the natural light image acquisition unit 70 may output only data of a luminance image that does not include color information.

The polarized image acquisition unit 72 includes an array of imaging elements for detecting polarization in four orientations as illustrated in FIG. 2, and thereby outputs data of polarized images in four orientations captured at a predetermined frame rate. The polarized image acquisition unit 72 may also serve as the natural light image acquisition unit 70 because a non-polarization luminance image can be generated by averaging detection values of polarization in the four orientations. At this time, a mechanism for generating the non-polarization luminance image from the polarized image may be provided in the polarized image acquisition unit 72 or may be provided in the information processing device 10. The polarized image acquisition unit 72 may serve as the stereo camera, or the natural light image acquisition unit 70 and the polarized image acquisition unit 72 may form the stereo camera.

The reference light irradiation unit 74 emits reference light of a predetermined wavelength band to the subject space. Here, the reference light selects a wavelength band that is easily absorbed by the material to be detected. In this embodiment, diffuse reflection, which is absorbed once on the subject surface and then diffusely reflected internally, is intentionally created by appropriately selecting the wavelength band of the light to be irradiated. Then, utilizing the fact that the polarization degree of the diffuse reflection is low, an image of a subject having a material to be detected is specified on the basis of the polarization degree. Typically, an image of a part of a person whose skin of a hand or the like is exposed is specified by emitting an infrared ray. Hereinafter, the reference light will be described as the infrared ray, but it is not intended to limit the wavelength band to that of the infrared ray.

The reference light irradiation unit 74 may emit the infrared ray constantly or only at necessary timing. The polarized image acquisition unit 72 notifies the polarized image acquisition unit 72 of the timing when the infrared ray is irradiated, whereby the polarized image acquisition unit 72 adds information of the timing to the data of the polarized image under the infrared ray irradiation etc., to distinguish it from data during a period in which the infrared ray is not irradiated and outputs the data. A technique of deriving a distance of the subject on the basis of the period of time, from the infrared ray irradiation until the reflected light detection, is known as time of flight (TOF). In the present embodiment, as described above, the infrared ray is utilized to specify the material of the subject. However, an infrared camera for detecting the wavelength band of the infrared ray may be separately provided to simultaneously acquire the distance of the subject by TOF.

A communication unit 78 establishes communication with the information processing device 10, and sequentially outputs data to the information processing device 10, the data including data of the captured image of the natural light output by the natural light image acquisition unit 70 and data of the polarized image of the four orientations output by the polarized image acquisition unit 72. Further, the communication unit 78 acquires information regarding the type of necessary data and the timing of the infrared ray irradiation from the information processing device 10, and appropriately notifies the natural light image acquisition unit 70, the polarized image acquisition unit 72, and the reference light irradiation unit 74.

Figure 5:
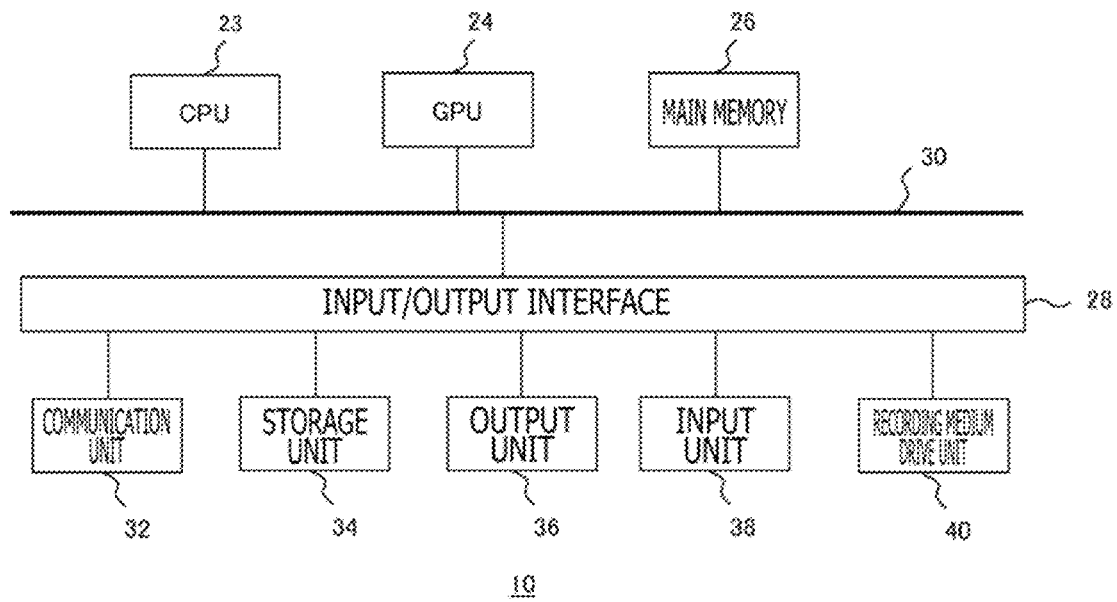
FIG. 5 is a diagram illustrating an internal circuit configuration of the information processing device in the present embodiment.

FIG. 5 illustrates an internal circuit configuration of the information processing device 10. The information processing device 10 includes a CPU 23, a GPU 24, and a main memory 26. These units are connected to one another via a bus 30. An input/output interface 28 is further connected to the bus 30. The input/output interface 28 is connected to: a communication unit 32 including a peripheral device interface such as a universal serial bus (USB) or Institute of Electrical and Electronics Engineers (IEEE) 1394, or a wired or wireless LAN network interface; a storage unit 34 such as a hard disk drive or a nonvolatile memory; an output unit 36 for outputting data to the display device 16; an input unit 38 for inputting data from the imaging device 12 or an input device (not illustrated); and a recording medium drive unit 40 for driving a removable recording medium such as a magnetic disk, an optical disk, or a semiconductor memory.

The CPU 23 controls the whole of the information processing device 10 by executing an operating system stored in the storage unit 34. The CPU 23 also executes various programs read from the removable recording medium and loaded into the main memory 26 or downloaded via the communication unit 32. The GPU 24 has a function of a geometry engine and a function of a rendering processor, and performs drawing processing according to a drawing command from the CPU 23, and stores display image data in a frame buffer (not illustrated). Then, the GPU 24 converts the display image stored in the frame buffer into a video signal and outputs the converted display image to the output unit 36. The main memory 26 includes a random access memory (RAM), and stores programs and data necessary for processing.

Figure 6:
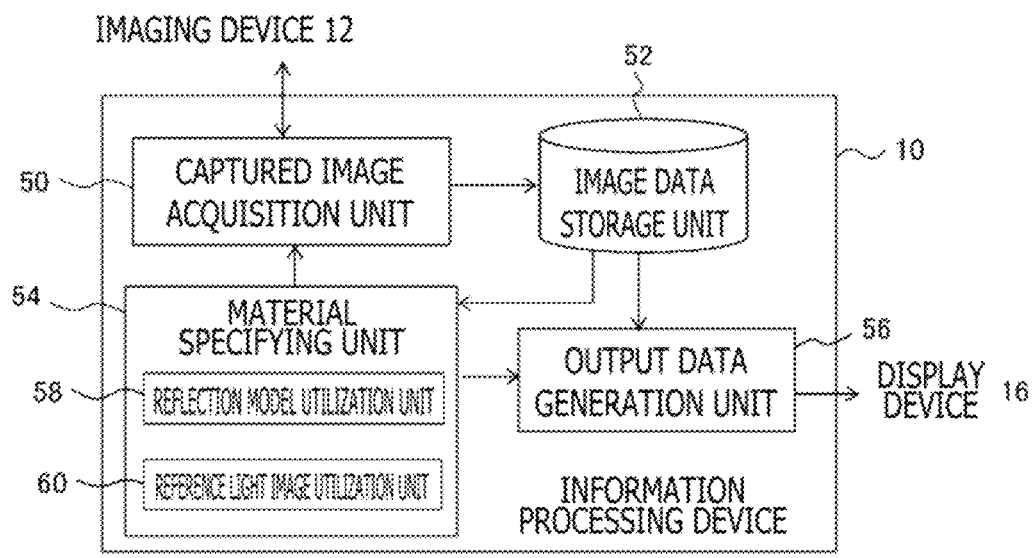
FIG. 6 is a diagram illustrating a configuration of functional blocks of the information processing device in the present embodiment.

FIG. 6 illustrates a configuration of functional blocks of the information processing device 10 according to the present embodiment. The information processing device 10 includes: a captured image acquisition unit 50 for acquiring the captured image data from the imaging device 12; an image data storage unit 52 for storing the acquired image data; a material specifying unit 54 for specifying a material of an subject appearing in the captured image; and an output data generation unit 56 for performing information processing on the basis of the specifying result of the material and generating data to be output.

The captured image acquisition unit 50 is implemented by the input unit 38, the CPU 23, etc. of FIG. 5, and acquires data of a captured image such as a polarized image from the imaging device 12 at a predetermined rate. Further, the captured image acquisition unit 50 transmits, to the imaging device 12, a request relating to the type of the necessary captured image and the irradiation timing of the infrared ray according to the specifying result by the material specifying unit 54 etc. The image data storage unit 52 is implemented by the main memory 26, and sequentially stores data of captured images acquired by the captured image acquisition unit 50. At this time, the captured image acquisition unit 50 may also generate and store the image data necessary for processing in a later stage, such as generating the luminance image from the natural light image or the polarized image, as necessary.

The material specifying unit 54 is achieved by the CPU 23 and the GPU 24 of FIG. 5, or the like and acquires the material of the subject appearing in the captured image at a predetermined rate using the data stored in the image data storage unit 52. More specifically, the material specifying unit 54 includes a reflection model utilization unit 58 and a reference light image utilization unit 60, and they specify the material of the subject by different methods. Since the two functions are independent from each other, either one may be provided as the material specifying unit 54, or both may be provided to enhance the accuracy of specifying a material.

The reflection model utilization unit 58 specifies the material by solving an inverse problem of the rendering equation that is generally used in computer graphics drawing. That is, the reflection model utilization unit 58 specifies the material of the subject from the viewpoint of how the light from the light source should be reflected on the subject surface in order to obtain the luminance observed as the captured image. Therefore, the reflection model utilization unit 58 acquires the positional relation among the subject in the real space, the imaging plane of the imaging device 12, and the light source. Then, the reflection model utilization unit 58 derives the reflection characteristic on the subject surface on the basis of the positional relation and the luminance represented by each pixel of the captured image, and specifies the material from which such reflection characteristic may be obtained. Details will be described later.

Conversely, the reference light image utilization unit 60 acquires a polarization degree distribution from the polarized image captured at the time of the infrared ray irradiation, and extracts a region in which the polarization degree is smaller than a predetermined threshold value. As described above, in the case of a subject that easily absorbs the infrared ray, the reflected light from the surface of the subject is dominated by the diffuse reflection component. Since the polarization degree of the diffuse reflection is much smaller than that of the specular reflection, an image indicating a low polarization degree when irradiated with the infrared ray may be assumed to be a material having a high infrared absorptivity. According to this principle, it is possible to specify, for example, an image of a part of a human body where the skin is exposed, such as a hand. A specific example will be illustrated later.

The output data generation unit 56 is achieved by the CPU 23, the GPU 24, the output unit 36, etc. of FIG. 5, and performs predetermined information processing on the basis of the relation between the image and the material specified by the material specifying unit 54, and generates data to be output such as display images and voice. As described above, contents of the information processing performed here are not particularly limited. With the material of the subject appearing in the image proven, it is possible to obtain a motion of a substance whose material is known, such as human hands and a controller, thereby progressing the electronic game using the motion as input information. Alternatively, the output data generation unit 56 may achieve augmented reality by reading out data of a captured image of natural light from the image data storage unit 52 and drawing a virtual object so as to be in contact with a target substance having a specific material.

In the present embodiment, since an image of a symmetrical substance can be specified with high accuracy through the material, obtaining a distance to the target substance or specifying change of the shape or position to the target substance may be efficiently performed by limiting only to the image of the target substance. Alternatively, it is also possible to obtain a normal vector distribution on the surface of the symmetrical substance by using polarized images of four orientations stored in the image data storage unit 52. A method for obtaining a normal vector of a subject from a polarized image is widely known. That is, the normal to the target substance surface may be expressed by an azimuth angle α that represents an angle of the light incident surface (the exit surface in the case of diffuse reflection) and a zenith angle θ that represents an angle on the surface. The azimuth angle α represents the principal axis angle that gives the minimum luminance $I_{min}$ in Equation 1 in the case of specular reflection, and represents the principal axis angle that gives the maximum luminance $I_{max}$ in Equation 1 in the case of diffuse reflection. The zenith angle θ has the following relation with the polarization degree $\rho_s$ in the case of specular reflection and the polarization degree $\rho_d$ in the case of diffuse reflection.

[Math. 3]

$$\rho_s = \frac{2\sin^2\theta\cos\theta\sqrt{n^2-\sin^2\theta}}{n^2-\sin^2\theta-n^2\sin^2\theta+2\sin^4\theta}$$

$$\rho_d = \frac{(n-1/n)^2\sin^2\theta}{2+2n^2-(n+1/n)^2\sin^2\theta+4\cos\theta\sqrt{n^2-\sin^2\theta}}$$

(Equation 3)

Here, n represents the refractive index of the substance. The zenith angle $\theta$ is obtained by substituting the polarization degree $\rho$ acquired with Equation 2 in either $\rho_s$ or $\rho_d$ in Equation 3. A normal vector $(p_x, p_y, p_z)$ is obtained with the following equation using the azimuth angle $\alpha$ and the zenith angle $\theta$ acquired as described above:

[Math. 4]

$$\begin{pmatrix} p_x \\ p_y \\ p_z \end{pmatrix} = \begin{pmatrix} \cos\alpha\cos\theta \\ \sin\alpha\cos\theta \\ \sin\theta \end{pmatrix}$$

(Equation 4)

As a result, not only the overall motion of the symmetrical substance, but also subtle angle change, surface boundaries, etc., may be acquired with high accuracy, so that the game may be diversified and the accuracy of the augmented reality may be improved. The output data generation unit 56 transmits output data such as a display image generated through such processing to the display device 16.

Figure 7:
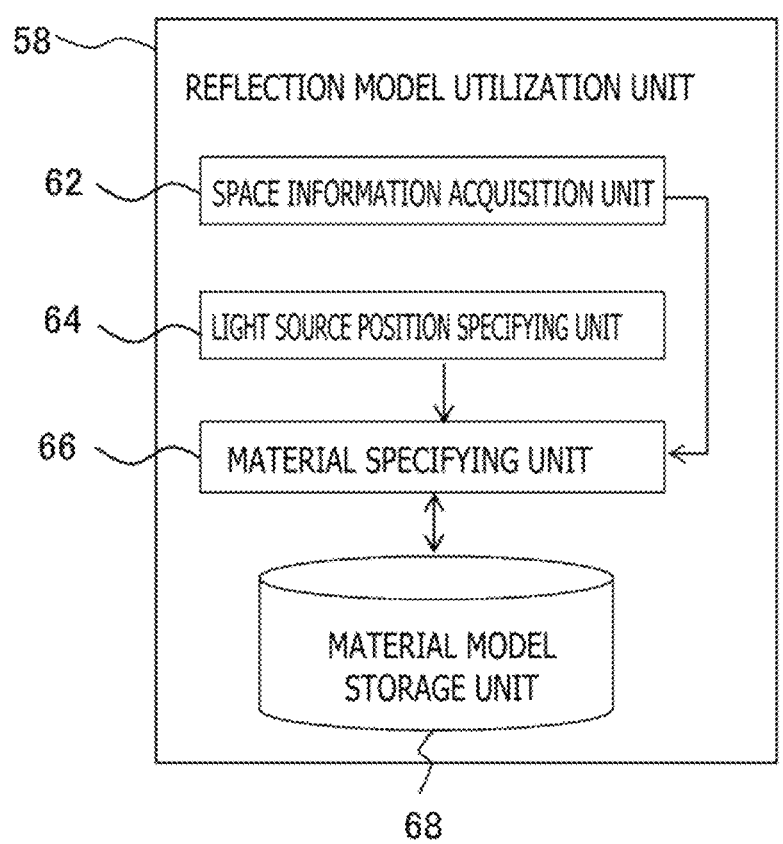
FIG. 7 is a diagram illustrating in more detail functional blocks of a reflection model utilization unit in the present embodiment.

FIG. 7 illustrates the functional blocks of the reflection model utilization unit 58 in more detail. The reflection model utilization unit 58 includes a space information acquisition unit 62, a light source position specifying unit 64, a material specifying unit 66, and a material model storage unit 68. The space information acquisition unit 62 acquires a positional relation between the subject included in the three-dimensional real space and the imaging plane of the imaging device 12 using the captured image. This information corresponds to processing of arranging an object in the world coordinate system in computer graphics and then setting a camera coordinate system.

Therefore, the space information acquisition unit 62 obtains corresponding points in captured stereo images, and obtains the distance from the imaging plane to each subject according to the principle of triangulation. Then, a positional relation between the surface of the subject and the imaging plane can be acquired by back-projecting the pixels of the captured image to the position in the three-dimensional space according to the distance. In the case in which the imaging device 12 is mounted on the head mounted display, the imaging plane moves relative to the three-dimensional space. In such a case, the technology of simultaneous localization and mapping (SLAM) is introduced by which the configuration (environmental map) of surrounding substances is acquired using the captured image and the position and the posture of the imaging plane relative to them are estimated. The space information acquisition unit 62 may further obtain the normal vector as described above using the polarized images of the four orientations and accurately specify the posture of the subject.

The light source position specifying unit 64 specifies the position of the light source in the three-dimensional real space. If imaging is performed with a fisheye lens or the like so as to cause the light source to be present in the field of view, the position of the light source may also be obtained basically in the similar manner to the space information acquisition unit 62. However, depending on imaging environments, due to the presence of a glossy material in which the specular reflection is dominant, the reflection thereon may be observed with the luminance equivalent to that of the light source. In this case, it is conceivable that the position where the reflection occurs is misspecified as the light source, and the accuracy in specifying the material is deteriorated.

Thus, the light source position specifying unit 64 distinguishes the image of the light source from the image of the reflected light by utilizing the polarization degrees as described above. Since high luminance intensity reflection that is easily misspecified as a light source has a large specular reflection component, the high luminance intensity reflection can be easily distinguished from isotropic light from the light source by comparing the polarization degrees. That is, the polarization degrees of image candidates of the light source in the captured image are confirmed, and an image indicating a polarization degree higher than a predetermined threshold value is determined not to be the light source and excluded from the candidates.

In the case in which a liquid crystal display is present in the subject space, the light emission from the screen for the display has a high polarization degree. Therefore, the light source position specifying unit 64 further distinguishes the image of the liquid crystal display from the image of the reflected light having a large specular reflection component among the images of the light excluded based on the polarization degree as described above. In the latter, the polarization degree is attenuated as the distance from the center of the region where the light source such as an illumination is specularly reflected is increased, while a light emitting display has a uniform polarization degree over the entire screen having a relatively large area. Therefore, the light source position specifying unit 64 distinguishes those images on the basis of the spatial distribution of polarization degrees.

The material specifying unit 66 specifies the material of the subject by establishing an equation using the reflection model on the basis of the information of the luminance indicated by the captured image and the positional relation among the subject, the imaging plane, and the light source in the three-dimensional space acquired by the space information acquisition unit 62 and the light source position specifying unit 64. In general computer graphics, an object with a reflection characteristic set is arranged in the world coordinate system, and a light source and a camera coordinate system are set to calculate the luminance distribution of the reflected light from the object surface. At this time, the luminance L(r, co) of the light emitted in a direction co at a point r on the object surface is determined by the following rendering equation.

[Math. 5]

$$L(r,\omega)=L_e(r,\omega)+\int_S f_r(r,\omega,\omega_i)L_i(r,\omega_i)\cos(\Theta)d\omega_i$$

(Equation 5)

Here, $L_e(r, \omega)$ is the luminance of light emitted by the substance itself at point r. $f_r(r, \omega, \omega_i)$ is a bi-directional reflectance distribution function (BRDF) representing the reflection characteristic of the light at the point r. The BRDF represents a ratio of the luminance L(r, $\omega$) of the reflected light in the direction co to the luminance $L_i(r, \omega_i)$ of the incident light in the incident direction $\omega_i$. This function depends on the material. Further, $\Theta$ is an angle including the direction of the normal to the subject surface at the point r and the reflection direction ω of the light, and $S_i$ is a range of the incident direction $ω_i$ of the light at the point r. As a result, the luminance L(r, ω), and hence the luminance of the image representing the point r on the captured image, are determined by the normal at the point r and the positional relation between the point r and the light source and the imaging plane, as well as by the material of the subject.

If the luminance value of the image represented by the captured image is given to the left side utilizing the relation of Equation 5, any parameter included in the right side can be obtained. This method is called inverse rendering as the inverse problem of graphics rendering. Since the function $f_r$ is actually a four-dimensional function including the azimuth angle and the zenith angle of each of the incident light and the reflected light even if the material of the subject is uniform, various models have been proposed to express it concisely. (For example, see "Inverse rendering: restoration of optical information from an image," Yoichi Sato.

In the present embodiment, a material model is generated in advance, in which a material assumed as a subject is associated with the function $f_r$ or data (reflection characteristic) obtained by approximating the function $f_r$ with a predetermined model, and stored in the material model storage unit 68. Alternative parameters of the function $f_r$ may be acquired as actual value data of a reflection characteristic for each material by capturing substances of various materials in advance. The material specifying unit 66 obtains the reflection characteristic by solving Equation 5 inversely from the information obtained by the space information acquisition unit 62 and the light source position specifying unit 64, and from the luminance value of the image in the captured image. The material specifying unit 66 then refers to the material model using it as an index.

Then, the most suitable material is selected as the material of the subject that is the source of the image. Since the relation between the image and the subject is proven by the space information acquisition unit 62, it is sufficient if the above-described processing is performed on an image basis in order to obtain the material of the subject. As described above, various models have been proposed as a model for simplifying the rendering equation, and an appropriate model is selected therefrom according to the environment of the subject space assumed actually, and the processing performance of the information processing device 10, etc. Note that, since the target of which the material is specified in the present embodiment is a substance other than a light-emitting body, the first term of Equation 3 may be omitted.

Although, in the above processing, the luminance of the captured image of the natural light is used, the polarized images of the four orientations, which are also acquired in the present embodiment, may be utilized. That is, for each material and for each polarization orientation, parameters corresponding to the function $f_r$ are acquired and stored in the material model storage unit 68. Then, the material having the reflection characteristic closest to the reflection characteristic of each orientation is specified, the reflection characteristic of each orientation being acquired from the luminance of the polarized images of the four orientations actually obtained using Equation 5. For example, the luminance L(r, ω) of the reflected light in Equation 5 can be expressed by the following model as the sum of the diffusely reflected component and the specularly reflected component of the incident light with luminance $L_i$ (r, $ω_i$).

[Math. 6]

$$L(r,ω)=L_i(r;ω_i)k_d \cos α+L_i(r;ω_i)k_s \cos^h(ω-β) \quad \text{(Equation 6)}$$

The above equation is widely known as a Phong model in the field of computer graphics. Note that the component of ambient light is omitted. Here, $k_d$ is a diffuse reflectance, $k_s$ is a specular reflectance, and h is a parameter representing the degree of gloss unique to the material. These parameters depend on the material. Also, R is an angle between the normal vector at the position r of the substance surface and the vector in the light source direction, and obtained on the basis of the positional relation of the subject and the light source in the three-dimensional space. The positional relation is acquired by the space information acquisition unit 62 and the light source position specifying unit 64.

Assuming that the luminance of the diffuse reflection component of the first term in the right side and the luminance of the specular reflection component of the second term are $i_d$ and is, respectively, the polarization luminances $I_d(θ_{pol})$ and $I_s(θ_{pol})$ of the diffuse reflection component and the specular reflection component with respect to the principal axis angle $θ_{pol}$ of the polarizer are expressed as follows.

[Math. 7]

$$I_d(θ_{pol})=i_d(1+ρ_d \cos(2(θ_{pol}-φ)))$$

$$I_s(θ_{pol})=i_s(1-ρ_s \cos(2(θ_{pol}-φ))) \quad \text{(Equation 7)}$$

Here, $ρ_d$ and $ρ_s$ are the polarization degree of the diffuse reflection component and the polarization degree of the specular reflection component expressed by Equation 3, respectively. They are the values depending on the refractive index n and hence the material, assuming that the positional relation of the subject and the light source in the three-dimensional space is known that is acquired by the space information acquisition unit 62 and the light source position specifying unit 64. When adding Equation 7 at the respective principal axis angles $θ_{pol}$=0°, 15°, 30°, and 45°, the luminance L(r, ω, $θ_{pol}$) of the polarization of the corresponding orientations may be obtained. Therefore, by preparing parameters $k_d$, $k_s$, h, and n for each material, a ratio of the luminance L(r, ω, $θ_{pol}$) of the polarization of the reflected light in the direction ω with respect to the luminance $L_i$(r, $ω_i$) of the incident light in the incident direction $ω_i$, i.e., the function $f_r$, may be obtained for each polarization orientation.

Then, the most suitable material is selected by comparing the function $f_r$ obtained by setting Equation 5 for each polarization orientation with the function $f_r$ obtained for each material and each polarization orientation from the parameters $k_d$, $k_s$, h, and n stored in the material model storage unit 68 as well as from the positional relation between the light source and the subject in the three-dimensional space. In this case, since the functions $f_r$ to be compared are four functions, the difference is obtained for each orientation, and the material with the smallest sum is selected. Alternatively, the polarization luminance may be obtained for each orientation by Equation 5 assuming the material in advance, and the material closest to the actual polarized image may be selected. In any case, by utilizing the luminance of the polarization in the four orientations, the material can be obtained with higher accuracy from the viewpoint of the proportion of the polarization component.

Alternatively, a model other than the model represented by Equation 5 may be applied to estimate the material based on the similar principle. For example, as a material model, a ratio γ of the diffuse reflection component and the specular reflection component included in the reflected light is stored in association with the candidate material. Here, γ is a function of the above-mentioned angle β and the angle ω of the reflection direction. As mentioned above, the spectrum of the reflected light is a linear sum of these reflected components. Accordingly, by determining the value of γ on the basis of the position of the light source, the positions and the postures of the subject and the imaging plane, the polarization characteristics of the light incident on each pixel of the imaging plane, i.e., change of the polarization luminance with respect to the orientation can be acquired. By comparing the result with the change of the polarization luminance acquired from Equation 1 using the actual polarized image, the material with the smallest difference may be specified as the true material. The functions $f_r$ and γ may be obtained in advance as actual value data for each material and for each polarization orientation by changing the positions of the light source and the imaging device in various ways to acquire the polarized images, and the actual value data may be stored in the material model storage unit 68.

Figure 8:
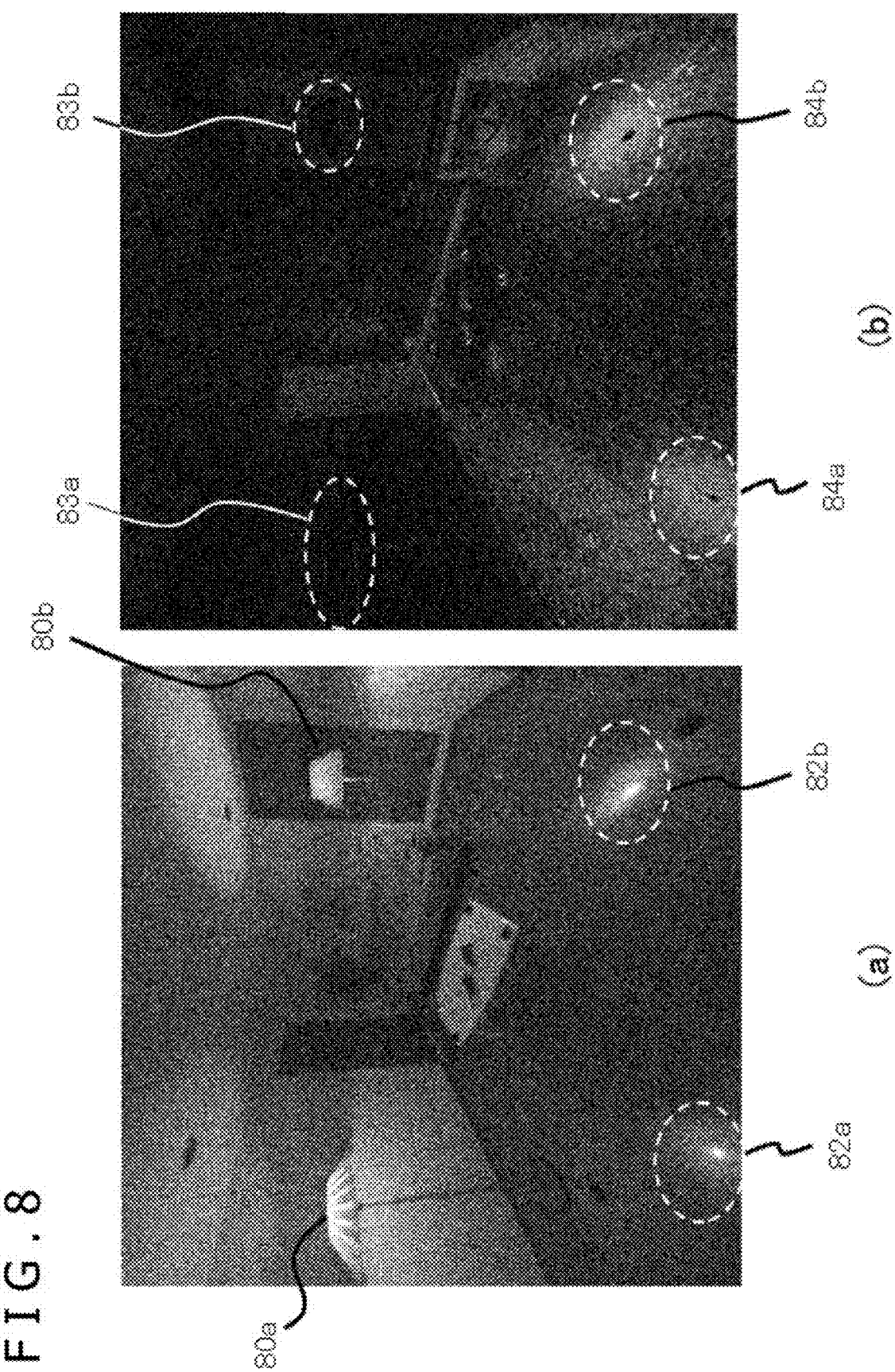
FIG. 8 depicts diagrams for describing processing in which a light source position specifying unit specifies a position of a light source by the polarization degree in the present embodiment.

FIG. 8 depicts diagrams for describing processing in which the light source position specifying unit 64 specifies the position of the light source by the polarization degree. (a) of FIG. 8 illustrates a luminance image of the natural light captured in an illuminated room. In this example, in addition to images 80a and 80b of the two floor stand illuminations, images 82a and 82b of the light reflected from the floor appear with high luminance. In particular, on a glossy floor and table, as illustrated in the drawing, the reflected light may be captured with the same luminance as the illuminations.

In the case in which the light source position in the three-dimensional space is set on the basis of this image and applied to the rendering equation as described above, it is conceivable that the correct material may not be specified as a result of misspecifying the reflected light as the light source. Not limited to the material specifying processing, it is effective to improve the processing accuracy by allowing for distinction between the light source and the reflected light in various information processing, for example, in a case of drawing a virtual object so as to reflect the actual light source, or in a case of performing image analysis on the basis of the position of the light source, etc.

(b) of FIG. 8 illustrates a polarization degree image generated on the basis of the polarized image corresponding to (a) of FIG. 8. Here, the polarization degree image is an image having the polarization degree calculated by Equation 2 as a pixel value, and in the figure, the higher the polarization degree, the greater the luminance. As illustrated in the figure, the light reflected from the floor is dominated by the specular reflection component, so that polarization degrees of images 84a and 84b are much greater compared with images 83a and 83b of the direct light from the floor stand illumination in which the diffuse reflection component is dominant. The central portions of the reflected light images 84a and 84b are blackened because the polarization degrees exceed the upper limit that may be set as the pixel value.

As described above, even the image of the reflected light which is difficult to distinguish from the light source in the luminance image of natural light may be easily specified as the reflected light by utilizing the polarization degree. With a camera mounted on a short robot, reflected light from the floor is likely to be in a field of view because the viewpoint is close to the floor. In the case of specifying a self-position by SLAM using an image captured in such a field of view, an erroneous environmental map may be created, or the processing may be broken by misspecifying actual lighting as reflection on the floor. If the present embodiment is applied so as to cause the reflected light distinguishable from the light source and being recognized, the robot control may be performed with high accuracy.

Figure 9:
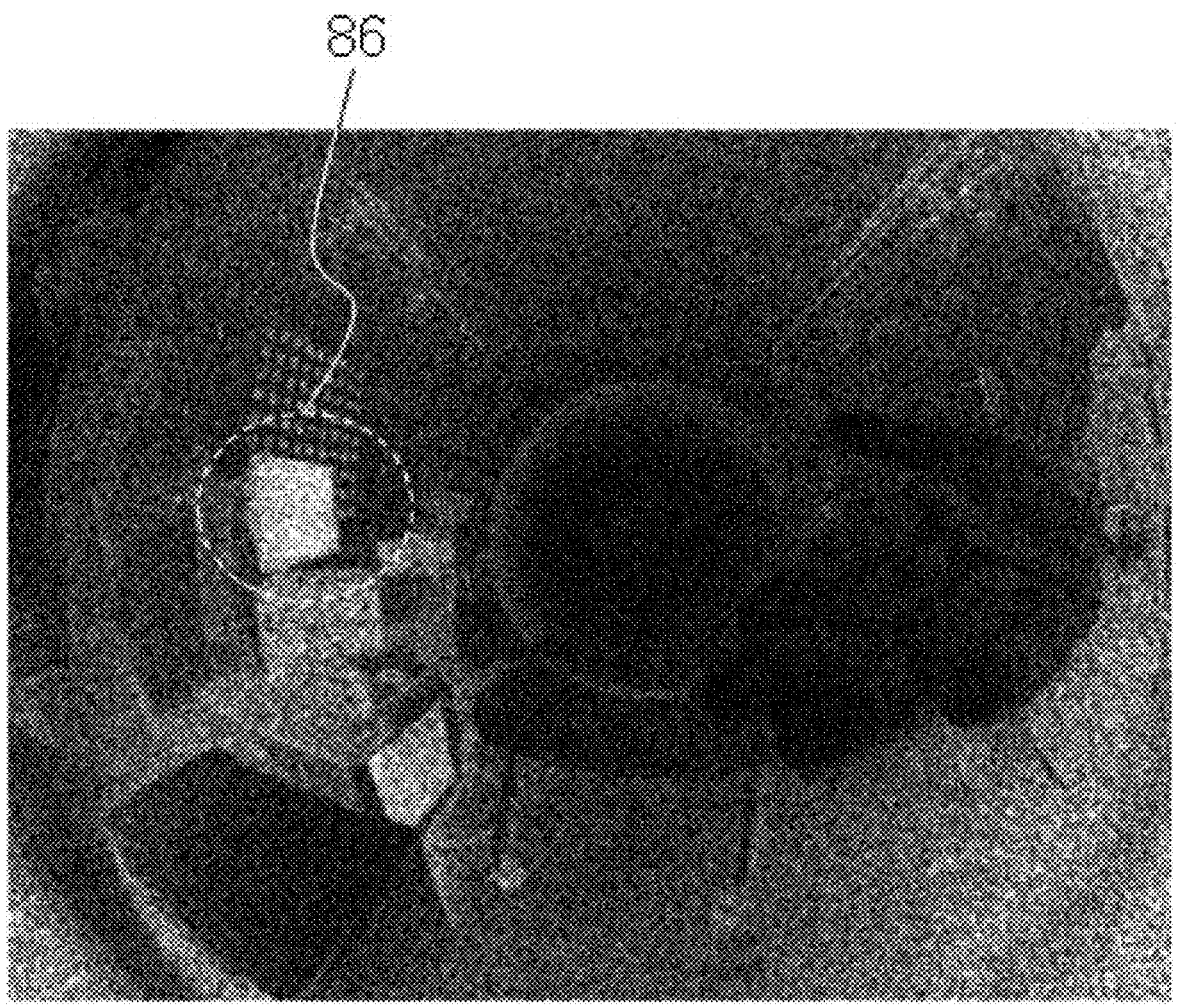
FIG. 9 is a diagram exemplifying a polarization degree image in a room where a liquid crystal display is present in the present embodiment.

FIG. 9 illustrates a polarization degree image in a room where the liquid crystal display is present. As illustrated in the drawing, the light emitted by the liquid crystal display is also easily distinguished from the light source as similarly illustrated in FIG. 8 due to a high polarization degree of the image 86. Further, in a case of the liquid crystal display, the polarization degree does not vary over the entire surface and the boundary with the background is prominent. In contrast, in a case of the images 84a and 84b of the light reflected from the floor illustrated in (b) of FIG. 8, the polarization degree is gradually attenuated toward the periphery with the center at the maximum value. Such difference in spatial distribution of the polarization degree may be utilized to distinguish the reflected light from the liquid crystal display.

Figure 10:
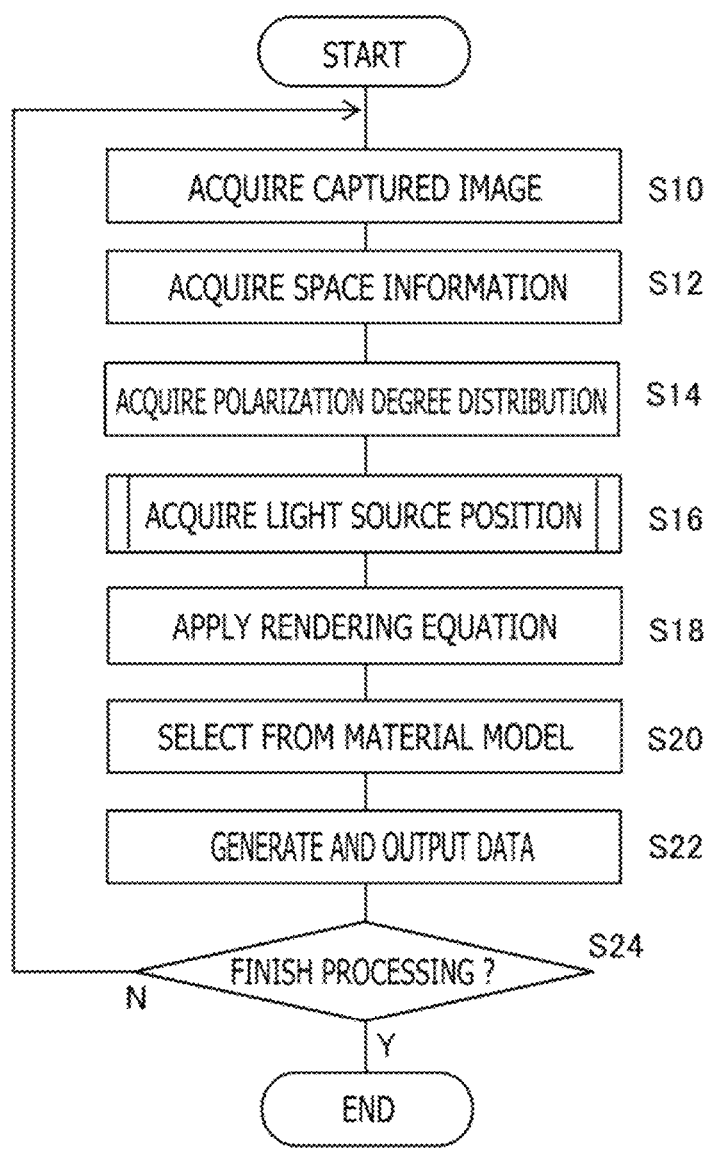
FIG. 10 is a flowchart illustrating a processing procedure in which the reflection model utilization unit of a material specifying unit specifies a material, and generates and outputs output data on the basis of the result in the present embodiment.

Next, movement of the information processing device 10 will be described. FIG. 10 is a flowchart illustrating a processing procedure in which the reflection model utilization unit 58 of the material specifying unit 54 specifies the material, and generates and outputs output data on the basis of the result. This flowchart is started when the user requests the information processing device 10 to start processing and the imaging device 12 starts capturing the target substance accordingly.

First, the captured image acquisition unit 50 acquires data of the captured image from the imaging device 12 and stores the data in the image data storage unit 52 (S10). The data includes polarized images of a plurality of orientations and a luminance image of the natural light. The data also includes stereo images captured by the stereo camera from the left and right viewpoints. The stereo image may be the captured image of the natural light or the polarized image. In the case in which the TOF mechanism is introduced, a distance image may be acquired instead of the stereo image. In addition, the luminance image of the natural light may be generated by the information processing device 10 computing the polarized images.

Next, the space information acquisition unit 62 of the reflection model utilization unit 58 acquires space information related to the positional relation between each subject in the three-dimensional space and the imaging plane, using the stereo image included in the captured image (S12). Conversely, the light source position specifying unit 64 acquires the polarization degree distribution as illustrated in FIG. 8(b) and FIG. 9 using the polarized images of the four orientations (S14). Then, the light source position specifying unit 64 extracts a region illustrating luminance equal to or higher than a predetermined threshold value as a light source candidate from the luminance value image, and then acquires the position of the light source in the three-dimensional space, which is acquired in S12, by specifying an image of a true light source on the basis of the polarization degree, and obtaining the distance by the stereo image (S16).

Next, the material specifying unit 66 derives the function $f_r$ or data obtained by approximating the function $f_r$ with a predetermined model by applying the relation of the subject, the imaging plane, the position and the posture of the light source in the three-dimensional space, and the luminance value of each pixel in the luminance image, to the rendering equation represented by Equation 5 (S18). Then, the material of the image is specified by selecting, from the material model storage unit 68, the material associated with or closest to the derived data (S20). As described above, the processing of S18 and S20 may be performed in image units. Alternatively, it may be performed in units smaller than the image, such as pixel units, and those results may be integrated to select the most probable material.

Instead of the processing of S20, the function $f_r$ or data, which is obtained by approximating the function $f_r$ with a predetermined model is assumed in advance, is applied to Equation 5, and an image is drawn in the similar manner as general drawing processing and compared with the actual captured image, whether the assumption has been appropriate may be determined. In this case, as data to be assumed, it is sufficient if data stored in the material model storage unit 68 in association with the material candidates is used. The images drawn assuming all materials are individually compared with the captured image, and the material, for which the smallest difference is obtained, is taken as the final specifying result.

Subsequently, the output data generation unit 56 performs predetermined processing on the basis of the obtained material, and generates output data of a display image and voice, and outputs the generated output data to the display device 16 (S22). The processing performed here is not particularly limited as described above. That is, an image of a subject having a predetermined material may be extracted, the position or the motion thereof may be specified, or further image analysis may be performed on the region of the image to draw a game screen, etc. Alternatively, a substance present in the field of view of the imaging device may simply be recognized on the basis of the material, or used for article inspection, and the data representing the result may be generated and output. Also, a control signal for approaching or grasping a substance of a predetermined material may be output to the robot.

During a period in which it is not necessary to stop the processing due to a user operation etc. (N in S24), the processing from S10 to S22 is repeated for the subsequent image frame. If it is necessary to stop the processing due to the user operation etc., all the processing is finished (Y in S24).

Figure 11:
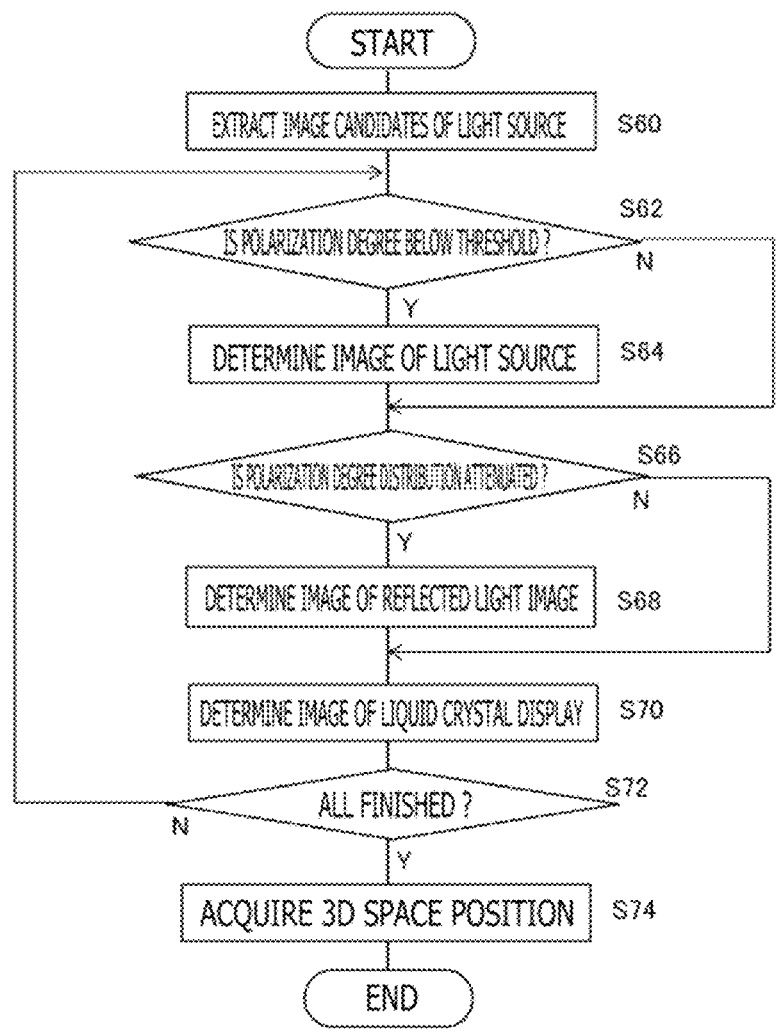
FIG. 11 is a flowchart illustrating in more detail a processing procedure in which the light source position specifying unit 64 specifies the position of the light source in S16 of FIG. 10.

FIG. 11 is a flowchart illustrating in more detail the processing procedure in which the light source position specifying unit 64 specifies the position of the light source in S16 of FIG. 10. The light source position specifying unit 64 first extracts an image having a luminance value equal to or greater than a predetermined threshold value from the luminance image as a candidate of the image of the light source (S60). Then, the polarization degree of the corresponding region in the polarization degree image is confirmed. When the polarization degree of the image candidate of the light source is less than or equal to the predetermined threshold value (Y in S62), the image is determined to be an image of the true light source (S64). When the polarization degree exceeds the threshold value (N in S62) and the distribution is such that the polarization degree attenuates toward the outside of the image (Y in S66), the image is determined to be an image of the reflected light (S68).

For example, the pixels that form the image are scanned in a horizontal direction or a vertical direction to acquire a one-dimensional distribution of the polarization degree, and are determined on the basis of the shape whether or not being attenuated. Alternatively, the histogram or the dispersion of the polarization degree of the pixels forming the image is acquired, and is determined to be attenuated when the dispersion of a predetermined level or more is confirmed. Besides, it is understood by the person skilled in the art that various criteria may be set for the determination. In the case in which the polarization degree is not attenuated, i.e., the polarization degree may be regarded as uniform throughout the image (N in S66), it is determined that the image is an image of the liquid crystal display (S70).

While all the image source candidates extracted in S60 are not determined, the determination processing from S62 to S70 is repeated for each image (N in S72). When all the images have been determined (Y in S72), the position in the three-dimensional space is acquired on the basis of the parallax of the corresponding image of the stereo image (S74). The target for acquiring the position here may be the entire light source, the place where the light from the light source is reflected, and all of the liquid crystal display, or may be the light source only, the light source and the liquid crystal display only, etc., by the processing performed in the latter stage.

Next, the function of the reference light image utilization unit 60 of the material specifying unit 54 will be described. As described above, the reference light image utilization unit 60 specifies an image of a subject that easily absorbs the infrared ray, for example, a portion where human skin is exposed, by utilizing a polarized image under infrared ray irradiation. A near infrared ray having a wavelength of approximately 700 to 900 nm is known to be easily transmitted through living tissue, and is utilized for imaging living tissue. Conversely, the infrared ray has the property of being easily scattered by living tissue as compared to X-rays and ultrasonic waves. Therefore, in a case in which the reflected light of the irradiated infrared ray is observed, the light is considered to be light that is transmitted through the skin surface and irregularly reflected by the living tissue, in which the diffuse reflection component is dominant.

Figure 12:
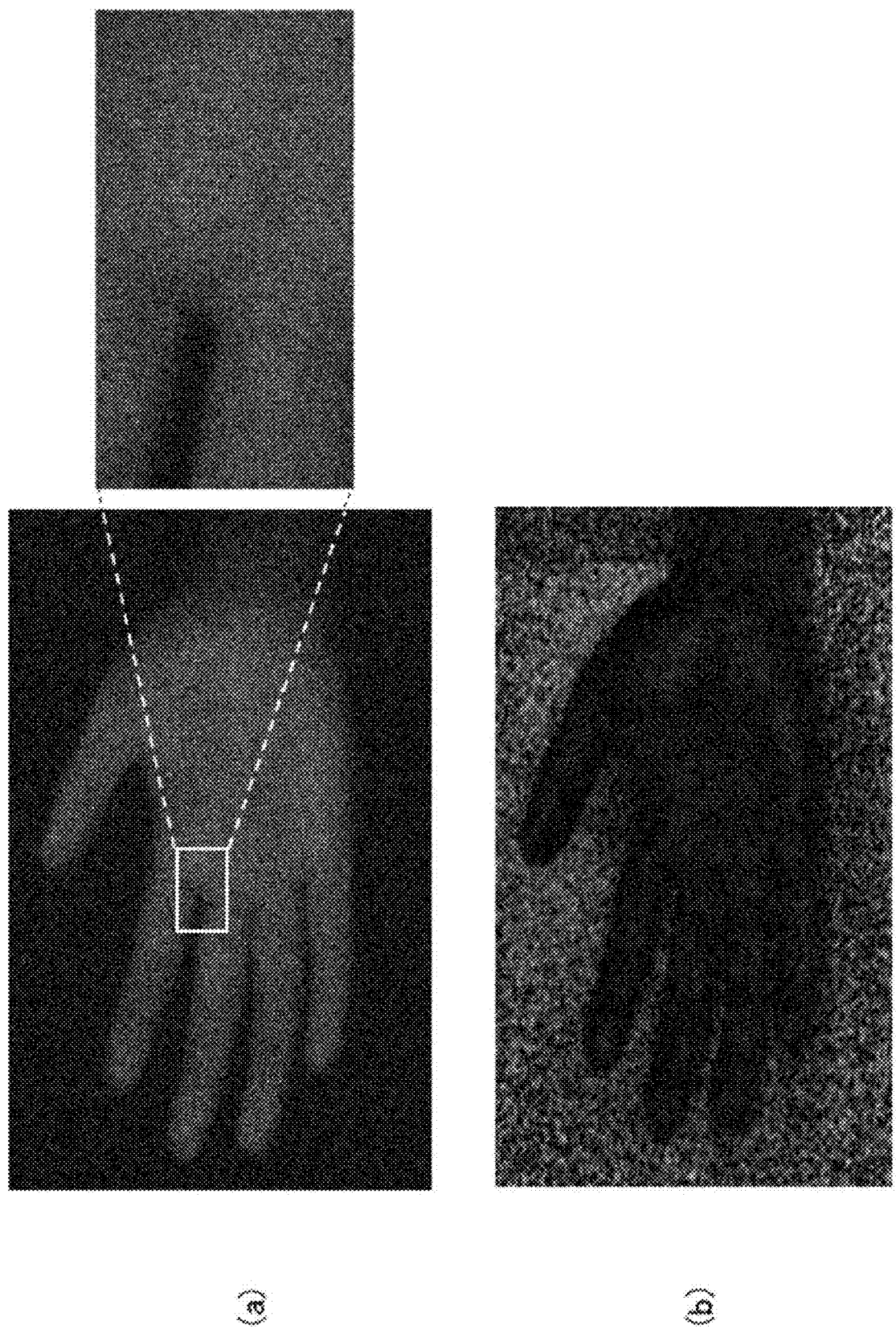
FIG. 12 depicts diagrams exemplifying a captured image in which a human hand is captured under infrared irradiation in the present embodiment.

FIG. 12 depicts diagrams exemplifying a captured image in which a human hand is captured under infrared ray irradiation. The infrared wavelength is in the near infrared region of 850 nm. In the luminance image illustrated in (a) of FIG. 12, while high luminance is obtained in the region of the hand, blood vessels are recognized by reflected light from the inside of the hand. In the polarization degree image illustrated in (b) of FIG. 12, the pixel value is uniformly small in the hand region as compared with the background region, and the polarization degree is low. That is, it may be understood that the low polarization degree allows the background region to be distinguished. Such a difference in polarization degree depends on degree of absorption of light on the surface, so that it is possible to stably extract the image of the hand even in a case in which it may be difficult to distinguish the luminance image depending on the lighting conditions.

FIG. 13 exemplifies a polarization degree image generated from a polarized image captured in a wide field of view. In the case in which the person as a subject does not have anything as illustrated in (a) of FIG. 13, the polarization degree of the hand region is uniformly reduced as compared with the images of other subjects in the surroundings similar to FIG. 12, so that the image may be extracted with high accuracy. As illustrated in (b) of FIG. 13 and (c), even in the case in which the user has a beverage bottle etc., the polarization degree is high only in the portion of the bottle image, so that the distinction from the hand image may be performed accurately.

Thus, for example, it is possible to cut out only the portion of the image of the beverage bottle and replace it with another image, or to recognize that the person has something. In particular, in a case of achieving augmented reality in which a person operates a virtual object by hand, it is important to be able to distinguish and specify the region of the hand image from the other region. Since the skin in the hand is likely to be exposed normally, the hand is also convenient as a specifying target of the present embodiment utilizing the infrared absorption and the polarization degree. However, as described above, if light in a wavelength band that is easily absorbed by the target substance is utilized, accurate specifying may be performed by the similar processing even for substances having other materials.

Figure 14:
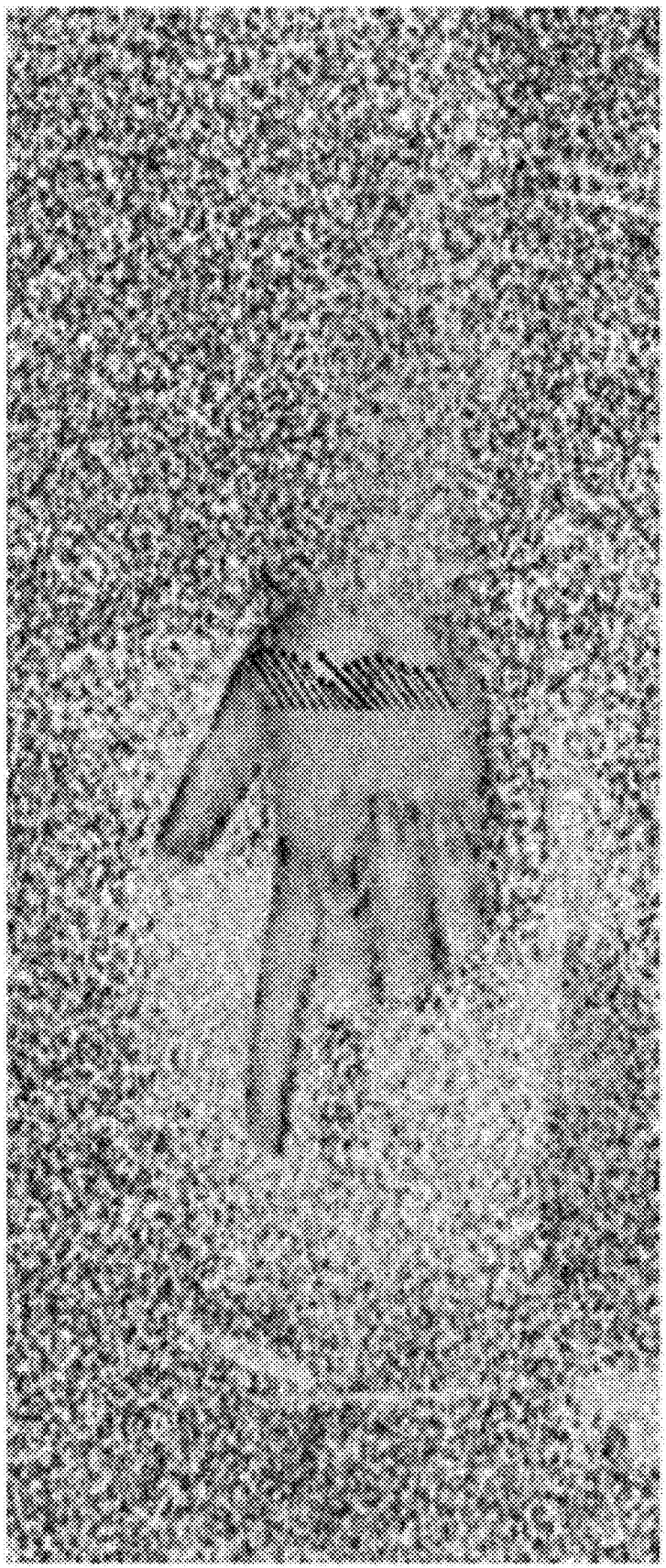
FIG. 14 is a diagram illustrating a normal image in which normal vectors calculated from polarized images of four orientations are illustrated as pixel values in the present embodiment.

FIG. 14 illustrates a normal image in which normal vectors calculated from the polarized images of the four orientations are illustrated as pixel values for the region of the hand illustrated in (a) of FIG. 13. Although calculation of the normal vector is performed by the output data generation unit 56, by the reference light image utilization unit 60 of the material specifying unit 54 extracting the region of the image of the hand, only the region concerned may be the calculation target of the normal vector. This extraction results in high processing efficiency. In the figure, it may be seen that the normal to the palm may be derived accurately, as exemplified by the distribution of arrows. Therefore, the above-described augmented reality and gesture recognition by a hand may be performed with high accuracy.

The reference light image utilization unit 60 utilizes a captured image under infrared ray irradiation. Therefore, it is possible to be combined with the TOF technique, in which the distance to the subject is measured by the time from the infrared irradiation until the reflected light detection. In the case in which the subject is semitransparent, the light in which the transmitted light is scattered and reflected inside the subject is observed later than the light reflected on the surface, so that there may be a case in which the measured distance is longer than the actual distance. A technique has been proposed that utilizes this property to classify the material of a subject from distortion of the measured distance (see "Classification of semitransparent substances based on distance measurement distortion of TOF camera," Iwaguchi et al., Report on Computer Vision and Image Media, 2016, CVIM-203, Vol 12, P. 1 to 7).

This technique utilizes the fact that the intensity of light scattering inside varies depending on the material of the subject, and the distortion that occurs in the distance measurement value also depends on the material. When a polarized image is captured under the same condition and the polarization degree is evaluated, the polarization degree varies with the material according to the similar principle. Even in the example illustrated in FIG. 13, a specific polarization degree is obtained in the region of the beverage bottle. Accordingly, instead of setting one threshold value for the polarization degree as described above and extracting the region of the human skin, the material of the subject may be also classified by associating the range of the polarization degree assumed for each material. Further, the material classification based on the distortion of the measurement value by the TOF camera and the material classification based on the polarization degree may be simultaneously performed to improve the accuracy of specifying the material.

Further, among the distance images generated by TOF, a region in which an error occurs due to the infrared absorption may be determined by the low polarization degree. For example, in a region where the polarization degree is equal to or less than a predetermined value, it is assumed that the infrared rays are absorbed at the corresponding subject surface, and then the distance value obtained therein is corrected to be reduced by a predetermined ratio. Since both the polarization degree and the error of the distance value are affected by the absorptivity of the infrared rays, if the correlation between the polarization degree and the error is acquired in advance, the distance value may be accurately corrected on the basis of the polarization degree.

Figure 15:
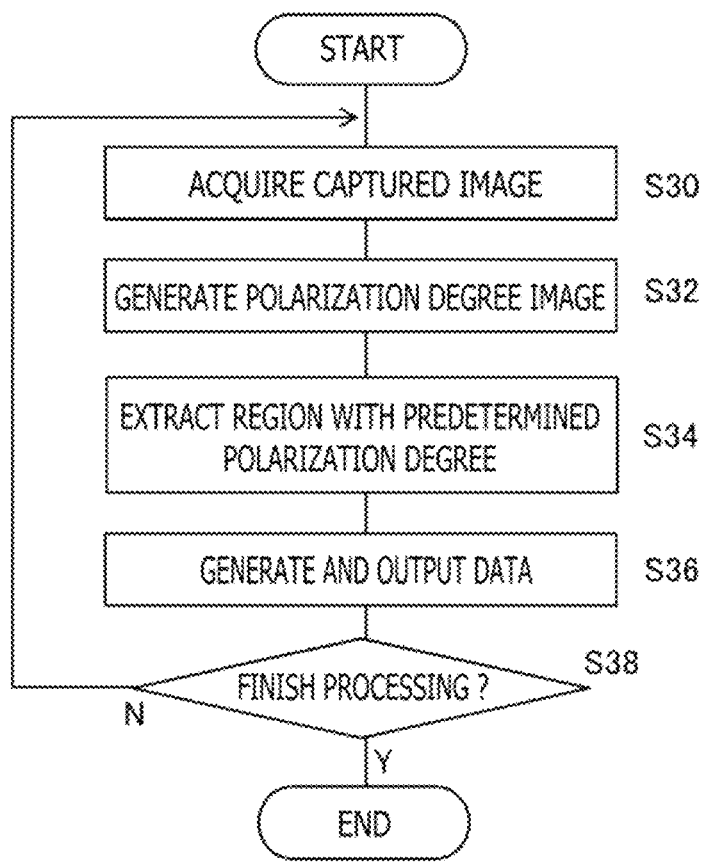
FIG. 15 is a flowchart illustrating a processing procedure in which a reference light image utilization unit of the material specifying unit specifies a material and generates and outputs output data on the basis of the result in the information processing device of the present embodiment.

FIG. 15 is a flowchart illustrating a processing procedure in which a reference light image utilization unit 60 of the material specifying unit 54 specifies a material and generates and outputs output data on the basis of the result in the information processing device 10 of the present embodiment. This flowchart is started when the user requests the information processing device 10 to start processing and the imaging device 12 starts capturing the target substance accordingly.

First, the captured image acquisition unit 50 acquires data of the captured image from the imaging device 12 and stores the data in the image data storage unit 52 (S30). This processing is similar to S10 of FIG. 10. However, at least the polarized image is a captured image when the reference light of a predetermined wavelength band such as the infrared rays is irradiated. Next, the reference light image utilization unit 60 calculates the polarization degree for each pixel using the polarized images of the four orientations, and generates a polarization degree image with the polarization degree being as the pixel value (S32).

Next, the reference light image utilization unit 60 extracts a region having a predetermined polarization degree in the polarization degree image as an image of a target substance having a predetermined material (S34). For example, in a case of a hand, a region where the polarization degree is smaller than a predetermined threshold value is extracted. In a case of specifying images of two or more types of target substances of different materials, regions indicating the polarization degree set in the respective regions are extracted. An image clearly different from the target substance may be excluded from the extraction result by performing pattern matching on the extracted region.

Subsequently, the output data generation unit 56 performs predetermined processing on the basis of the obtained material, generates output data of the display image or voice, and outputs the generated output data to the display device 16 (S36). This processing may be similar to S22 of FIG. 10. However, as described above, the image of the subject having a predetermined material may be included in the processing of final determination by correcting the distance value measured by TOF, or integrating the material estimated utilizing TOF with the result of S34 processing. During a period in which it is not necessary to stop the processing due to a user operation, etc. (N in S38), the processing from S30 to S36 is repeated for the subsequent image frame. When it is necessary to stop the processing due to the user operation etc., all the processing is finished (Y in S38).

Figure 16:
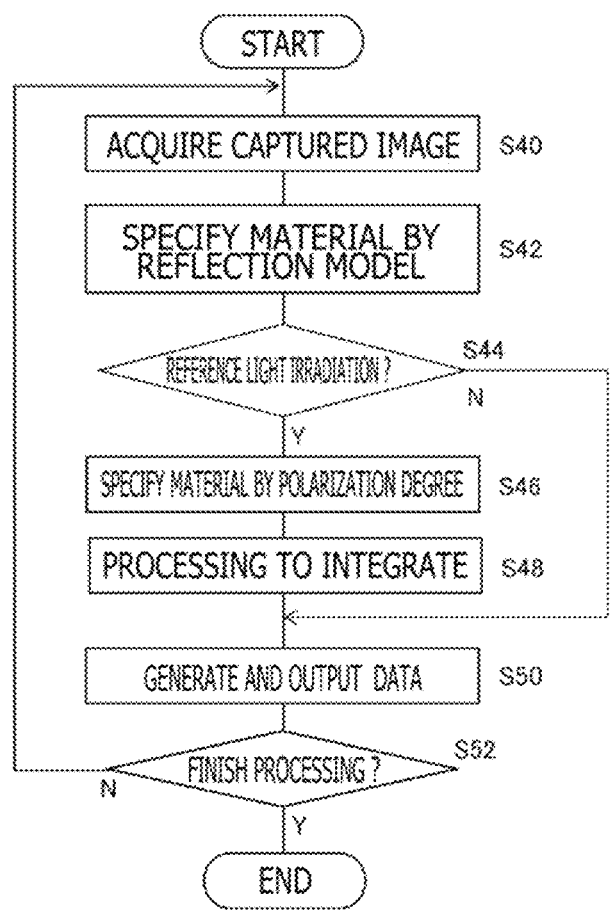
FIG. 16 is a flowchart illustrating a processing procedure in which both a reflection model utilization unit and the reference light image utilization unit of the material specifying unit specify a material and generates and outputs output data on the basis of the result in the information processing device of the present embodiment.

FIG. 16 is a flowchart illustrating a processing procedure in which both the reflection model utilization unit 58 and the reference light image utilization unit 60 of the material specifying unit 54 specify the material and generates and outputs output data on the basis of the result in the information processing device 10. This flowchart is started when the user requests the information processing device 10 to start processing and the imaging device 12 starts capturing the target substance accordingly.

First, the captured image acquisition unit 50 acquires data of the captured image from the imaging device 12 and stores the data in the image data storage unit 52 (S40). This processing is similar to S10 of FIG. 10. However, in this case, the captured image acquisition unit 50 requests the imaging device 12 to start and stop reference light irradiation at a predetermined timing. Therefore, there is a case in which the captured image to be acquired is the one under the reference light irradiation or a case other than the former case. The captured image acquisition unit 50 refers to additional data of the captured image transmitted from the imaging device 12 to distinguish the additional data and stores the data in the image data storage unit 52. In the processing procedure illustrated in FIG. 15, the imaging device 12 may emit the reference light only for a short period of time in response to a request from the captured image acquisition unit 50, and the processing of the latter stage may be performed in that period.

Next, the reflection model utilization unit 58 of the material specifying unit 54 specifies the material of the subject that is the origin of the image by applying the reflection model to the captured image (S42). This processing is in detail similar to the processing from S12 to S20 of FIG. 10. If the obtained captured image is not captured under the irradiation of the reference light (N in S44), the output data generation unit 56 performs predetermined processing on the basis of the obtained material, and output data of the display image or the voice is generated and output to the display device 16 (S50). This processing may also be similar to the processing of S22 of FIG. 10.

During a period in which it is not necessary to stop the processing due to a user operation etc. (N in S52), each processing in S40, S42, and S50 is repeated for the subsequent image frame. Basically, such a loop procedure continues, and when the reference light is irradiated at a predetermined timing (Y in S44), the reference light image utilization unit 60 of the material specifying unit 54 specifies an image of a subject having a predetermined material on the basis of the polarization degree obtained from the polarized image (S46). Here, the timing to start the irradiation of the reference light may be a predetermined time interval, or may be a time when a predetermined material such as human skin is specified in S42.

The reference light image utilization unit 60 integrates the result specified by itself in S46 and the result specified by the reflection model utilization unit 58 in S42 (S48). Here, the processing performed by the reference light image utilization unit 60 has a role of correcting the material specifying result by the reflection model utilization unit 58 or improving the accuracy of the material specifying processing by the reflection model utilization unit 58 in the subsequent frame. For example, by comparing a region extracted as an image of a hand image in S42 with the result by the polarization degree under the reference light irradiation, it is determined whether or not the region is the image of the hand truly. If it is determined to be not, it is excluded from the result. Also, when the region specified in S42 is misaligned, it is corrected to be the final result.

Furthermore, the information regarding the region specified in S46 may be output to the reflection model utilization unit 58. As a result, since the approximate position of the image of a specific target substance such as a human hand may be proven, the reflection model utilization unit 58 may efficiently specify the material by the reflection model by limiting the processing target to the region. By terminating the irradiation of the reference light temporarily and in a predetermined short period of time, it is possible to improve the accuracy in specifying the material without increasing the power consumption. If it is necessary to stop the processing due to a user operation etc., all the processing is finished (Y in S52).

According to the embodiment described above, the material of the subject appearing in the captured image is specified by at least one of the reflection model and the polarization degree under the reference light irradiation. In the former case, the inverse problem of the rendering equation is solved using the position and the posture of the subject in the subject space, the corresponding position and posture of the imaging plane, and the position of the light source, which are acquired by the luminance in the captured image, and the stereo image etc., Then, the reflection characteristic is acquired, and the corresponding material is specified. At this time, in order to distinguish the image of the light source in the captured image from the image of the reflected light from it, threshold value determination based on the polarization degree is performed.

Thus, the rendering equation may be accurately established without misspecifying the position of the image of the light source, and the material of the subject may be specified with high accuracy. In addition, by using the luminance value obtained from the rendering equation as the luminance of the polarized image and by comparing it with the polarized images of a plurality of orientations actually obtained, the material may be specified from more parameters than a case of using the luminance of the natural light, which may result in the improved accuracy.

In addition, by emitting the reference light in the wavelength band that is easily absorbed by the specific material to the subject space and performing the threshold value determination of the polarization degree, the image of the subject having the material is specified. This method intentionally creates a situation in which the light temporarily absorbed on the surface is internally scattered and the diffuse reflection becomes dominant, and has high robustness to the environment of the subject space such as the illuminance and the light source. Therefore, even with single processing, the image of the target substance of the predetermined material may be specified with high accuracy. Also, by combining with the material specifying processing using the above-mentioned reflection model, the processing efficiency may be increased or the accuracy may be further improved. As a result, it is possible to accurately extract the image of the target substance via the material or to recognize the substance in the field of view with high accuracy, and to derive the state of the target substance or perform information processing using it with high accuracy.

The present invention has been described above on the basis of the embodiments. It is to be understood by the person skilled in the art that suitable combinations of constituent elements and processes of the embodiment described above as examples may lead to further variations of the present disclosure and that such variations also fall within the scope of the present disclosure.

REFERENCE SIGNS LIST

10 Information processing device
12 Imaging device
16 Display device
23 CPU
24 GPU
26 Main memory
50 Captured image acquisition unit
52 Image data storage unit
54 Material specifying unit
56 Output data generation unit
58 Reflection model use unit
60 Reference light image utilization unit
62 Space information acquisition unit
64 Light source position specifying unit 66 Material specifying unit
68 Material model storage unit
70 Natural light image acquisition unit
72 Polarized image acquisition unit
74 Reference light irradiation unit
78 Communication unit

INDUSTRIAL APPLICABILITY

As described above, the present invention may be utilized for various information processing devices such as game machines, mobile terminals, personal computers, robots, inspection devices, and systems including the same.

The invention claimed is:

1. An information processing device comprising:
a space information acquisition unit configured to acquire a position and a posture of a subject in a real space on a basis of a captured image of the subject and acquire a position and a posture on an imaging plane that correspond to the position and the posture of the subject in the real space;
a light source position specifying unit configured to acquire a position of a light source in the real space on a basis of the captured image;
a material specifying unit configured to specify a material of the subject on a basis of a reflection characteristic of the subject when a predetermined reflection model is applied to the captured image, using the position and the posture of the subject, the position and the posture on the imaging plane, and the position of the light source; and
an output data generation unit configured to output data according to the specified material.

2. The information processing device according to claim 1, wherein
the material specifying unit specifies the material of the subject on a basis of a reflection characteristic of the subject obtained by applying the reflection model to each of polarized images of a plurality of orientations as the captured image.

3. The information processing device according to claim 1, further comprising:
a material model storage unit configured to associate material candidates with a ratio of a specular reflection component and a diffuse reflection component in reflected light;
wherein the material specifying unit specifies, as the material of the subject, a material having the smallest difference between change of an orientation of polarization luminance obtained assuming a corresponding ratio and change of an orientation of polarization luminance represented by the captured polarized image, among the material candidates.

4. The information processing device according to claim 1, wherein
the light source position specifying unit determines, among the candidates of the image of the light source having luminance equal to or higher than a predetermined threshold value in the captured image, an image having a polarization degree equal to or less than a predetermined threshold value as an image of the light source, the polarization degree being acquired from the image, and the light source position specifying unit acquiring the position of the light source in the real space utilizing the result.

5. The information processing device according to claim 4, wherein
the light source position specifying unit determines whether the candidate of the image of the light source the polarization degree of which is higher than the predetermined threshold value is an image due to reflection from the light source or an image of a liquid crystal display on a basis of a polarization degree distribution in the image.

6. The information processing device according to claim 1, further comprising:
a material model storage unit configured to store a material model that associates material candidates with the reflection characteristic;
wherein the material specifying unit acquires data representing the reflection characteristic by solving a rendering equation, and specifies, as the material of the subject, a material associated with the smallest difference in the reflection characteristic by referring to the material model.

7. The information processing device according to claim 1, further comprising:
a material model storage unit configured to store a material model that associates material candidates with the reflection characteristic;
wherein the material specifying unit applies the reflection characteristic to a rendering equation for each of the material candidates to draw an image, and specifies, as the material of the subject, a material that allows an image to be obtained with the smallest difference from the captured image.

8. A material specifying method by an information processing device, the method comprising:
acquiring a position and a posture of a subject in a real space on a basis of a captured image of the subject and acquiring a position and a posture on an imaging plane that correspond to the position and the posture of the subject in the real space;
acquiring a position of a light source in the real space on a basis of the captured image;
specifying a material of the subject on a basis of a reflection characteristic of the subject when a predetermined reflection model is applied to the captured image, using the position and the posture of the subject, the position and the posture on the imaging plane, and the position of the light source; and
outputting data according to the specified material.

9. A non-transitory computer readable medium having stored thereon a computer program for a computer, comprising:
by a space information acquisition unit, acquiring a position and a posture of a subject in a real space on a basis of a captured image of the subject, and acquiring a position and a posture on an imaging plane that correspond to the position and the posture of the subject in the real space;
by a light source position specifying unit, acquiring a position of a light source in the real space on a basis of the captured image;
by a material specifying unit, specifying a material of the subject on a basis of a reflection characteristic of the subject when a predetermined reflection model is applied to the captured image, using the position and the posture of the subject, the position and the posture on the imaging plane, and the position of the light source; and by an output data generation unit, outputting data according to the specified material.

* * * * *